US007864832B2

(12) United States Patent
Pisek et al.

(10) Patent No.: US 7,864,832 B2
(45) Date of Patent: *Jan. 4, 2011

(54) MULTI-CODE CORRELATION ARCHITECTURE FOR USE IN SOFTWARE-DEFINED RADIO SYSTEMS

(75) Inventors: Eran Pisek, Plano, TX (US); Yan Wang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1121 days.

This patent is subject to a terminal disclaimer.

(21) Appl. No.: 11/501,577

(22) Filed: Aug. 9, 2006

(65) Prior Publication Data

US 2006/0277236 A1 Dec. 7, 2006

Related U.S. Application Data

(63) Continuation-in-part of application No. 11/150,511, filed on Jun. 10, 2005, now Pat. No. 7,483,933, which is a continuation-in-part of application No. 11/123,313, filed on May 6, 2005.

(60) Provisional application No. 60/795,716, filed on Apr. 28, 2006.

(51) Int. Cl.
*H04B 1/00* (2006.01)

(52) U.S. Cl. .................. 375/140; 375/130; 375/136; 375/142; 375/150; 375/316; 375/343; 708/5

(58) Field of Classification Search .............. 375/130, 375/136–137, 140, 142, 150, 316, 343, 147, 375/151–153, 324, 340; 708/5, 231
See application file for complete search history.

(56) References Cited

U.S. PATENT DOCUMENTS

| | | | | |
|---|---|---|---|---|
| 4,983,970 A * | 1/1991 | O'Donnell et al. | ........... | 341/122 |
| 5,249,038 A * | 9/1993 | Stec | ........... | 348/453 |
| 5,365,549 A * | 11/1994 | Kazecki | ........... | 375/343 |
| 6,252,899 B1 * | 6/2001 | Zhou et al. | ........... | 375/140 |
| 6,307,907 B1 * | 10/2001 | Kim | ........... | 375/377 |
| 6,359,875 B1 * | 3/2002 | Hamada et al. | ........... | 370/342 |
| 6,363,108 B1 * | 3/2002 | Agrawal et al. | ........... | 375/152 |
| 6,452,982 B1 * | 9/2002 | O'Dell et al. | ........... | 375/316 |
| 6,473,449 B1 * | 10/2002 | Cafarella et al. | ........... | 375/141 |
| 6,961,393 B1 * | 11/2005 | Cupo et al. | ........... | 375/343 |
| 6,996,163 B2 * | 2/2006 | Bhora et al. | ........... | 375/150 |

(Continued)

*Primary Examiner*—Mohammad H Ghayour
*Assistant Examiner*—Sophia Vlahos

(57) ABSTRACT

A reconfigurable multi-code correlation unit for correlating a sequence of chip samples comprising 1) a memory for storing the chip samples; 2) a plurality of add-subtract cells, each add-subtract cell receiving a plurality of real bits, a, and a plurality of imaginary bits, b, from a first chip sample and storing each real bit, a, and each imaginary bit, b, in a data store; and 3) a plurality of sign select units. Each sign select units receives from one add-subtract cell a plurality of first inputs equal to a sum (a+b) of the real bits, a, and the imaginary bits, b, and a plurality of second inputs equal to a difference (a−b) of the real bits, a, and the imaginary bits, b. Each sign select unit generates a plurality of real outputs and a plurality of imaginary outputs, wherein each of the real and imaginary outputs is equal to one of 1) the sum (a+b) multiplied by one of +1 and −1 and 2) the difference (a−b) multiplied by one of +1 and −1.

28 Claims, 14 Drawing Sheets

U.S. PATENT DOCUMENTS

| | | |
|---|---|---|
| 7,016,398 B2 * | 3/2006 | Bradley ...................... 375/147 |
| 7,065,129 B2 * | 6/2006 | Joshi et al. .................. 375/149 |
| 7,145,938 B2 * | 12/2006 | Takeuchi et al. ............ 375/147 |
| 7,313,166 B2 * | 12/2007 | Bradley ...................... 375/147 |
| 7,483,933 B2 * | 1/2009 | Wang et al. ................. 708/422 |

* cited by examiner

| EVENT | START | S1 | S2 | S3 | S4 | S5 | S6 | S7 | S8 | S9 | S10 |
| --- | --- | --- | --- | --- | --- | --- | --- | --- | --- | --- | --- |
| E1 | S1 | S9 | S4 | S2 |  |  |  |  |  |  | S8 |
| E2 |  | S2 |  |  |  | S4 |  |  | S10 |  |  |
| E3 |  | S2 |  | S5 |  |  |  |  |  |  | S8 |
| E4 |  | S10 |  |  |  |  | S9 | S9 | S8 | S10 |  |
| E5 |  |  | S9 |  | S9 | S3 |  |  |  |  | S7 |
| E6 |  |  |  |  | S2 |  | S5 |  |  |  |  |
| E7 |  |  |  | S2 |  |  | S5 | S6 |  |  | STOP |

| CG (Re) | CG (Im) | OUTPUT (Re) | OUTPUT (Im) |
|---|---|---|---|
| 0 | 0 | a+b | -a+b |
| 0 | 1 | a-b | a+b |
| 1 | 0 | -a+b | -a-b |
| 1 | 1 | -a-b | a-b |

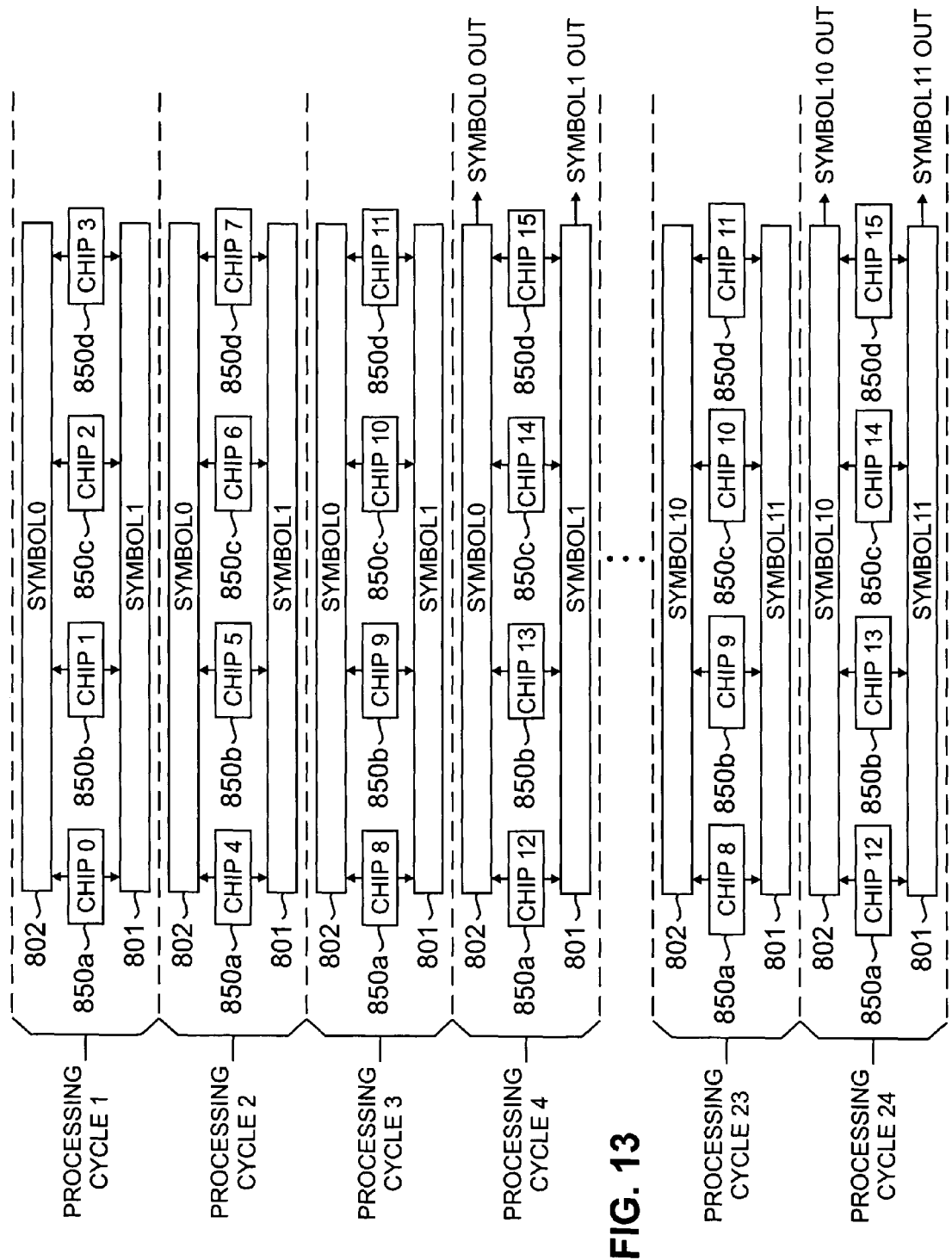

MULTI-CODE CORRELATION ARCHITECTURE FOR USE IN SOFTWARE-DEFINED RADIO SYSTEMS

CROSS-REFERENCE TO RELATED APPLICATIONS AND CLAIM OF PRIORITY

This application is related to U.S. Provisional Patent No. 60/795,716, filed Apr. 28, 2006, titled "Method and Apparatus For Multi-Code Correlation". Provisional Patent No. 60/795,716 is assigned to the assignee of this application and is hereby incorporated by reference as if fully set forth herein. The present application claims priority under 35 U.S.C. §119(e) to Provisional Patent No. 60/795,716.

This application is a continuation-in-part (CIP) of U.S. patent application Ser. No. 11/150,511, filed Jun. 10, 2005 now U.S. Pat. No. 7,483,933, titled "Correlation Architecture for Use in Software-Defined Radio Systems", which is a CIP of U.S. patent application Ser. No. 11/123,313, filed May 6, 2005, titled "Context-based Operation Reconfigurable Instruction Set Processor and Method of Operation." application Ser. Nos. 11/150,511 and 11/123,313 are assigned to the assignee of this application and are incorporated by reference into this application as if fully set forth herein. This application claims priority under 35 U.S.C. §120 to U.S. patent application Ser. Nos. 11/150,511 and 11/123,313.

TECHNICAL FIELD OF THE INVENTION

The present disclosure relates generally to wireless communication devices and, more specifically, to a multi-code correlation unit for use in software-defined radio (SDR) communication devices.

BACKGROUND OF THE INVENTION

Designing data processors for use in mobile stations is inherently difficult due to the tradeoffs that must always be made between competing considerations, including energy efficiency, computation power, and flexibility. Most current multi-standard wireless devices comprise blocks of separate and largely independent ASIC devices, each of which is related to a different wireless standard. The separate ASIC devices are stacked together in order to provide support for several wireless standards simultaneously. However, this approach results in increased die size, increased power consumption, and lack of flexibility.

As an alternative, software-defined radio (SDR) devices may be used. SDR devices use reconfigurable hardware that may be programmed over the air to operate under different wireless protocols. For example, an SDR transceiver in a wireless laptop computer may be configured by a first software load to operate in a CDMA2000 wireless network and may be reconfigured by a second software load to operate in an HSDPA wireless network. SDR systems minimize cost (design time, TTM) and power consumption, while maximizing flexibility, thereby providing an optimized combination of scalability and modularity.

One such approach involves a re-configurable correlation unit that may be implemented in a context-based operation reconfigurable instruction set processor, as disclosed in U.S. patent application Ser. No. 11/150,511, incorporated by reference above. Such a correlation unit matches the architecture to the domain of application and optimizes the performance and power jointly. Thus, the real-time processing requirements and low-power requirements of wireless mobile stations are met simultaneously. The correlation unit is highly re-configurable and may be used for different functional blocks operating under different standards.

However, in the case of High-Speed Data Packet Access (HSDPA) or other multi-code applications, the same data has to be entered multiple times into a same correlator cell in order to process the different HSDPA (or other multi-code standard) symbols. Entering the same input data stream over and over into the same cell in this manner increases the power of the input bus and complicates the addressing to the input memory block, resulting in an increase in die area and power consumption. Therefore, there is a need in the art for a multi-code correlation architecture for use in SDR systems that operates without requiring the same data to be entered into a correlator cell multiple times.

SUMMARY OF THE INVENTION

A reconfigurable multi-code correlation unit for correlating a sequence of chip samples is provided. According to an advantageous embodiment of the present disclosure, the reconfigurable multi-code correlation unit includes a memory, a plurality of add-subtract cells, and a processing unit. The memory is capable of storing the sequence of chip samples. Each of the add-subtract cells is capable of receiving a plurality of real bits, a, and a plurality of imaginary bits, b, from a first chip sample in the memory. In addition, each of the add-subtract cells is capable of storing each real bit, a, and each imaginary bit, b, in a data store. The processing unit includes a plurality of sign select units. Each of the sign select units is capable of receiving from one of the add-subtract cells a plurality of first inputs equal to a sum (a+b) of the real bits, a, and the imaginary bits, b, and a plurality of second inputs equal to a difference (a−b) of the real bits, a, and the imaginary bits, b. In addition, each sign select unit generates a plurality of real outputs and a plurality of imaginary outputs. Each of the real outputs and the imaginary outputs is equal to one of 1) the sum (a+b) multiplied by one of +1 and −1 and 2) the difference (a−b) multiplied by one of +1 and −1.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a finite state machine (FSM) table for a data processor;

FIG. 13 illustrates the data output of the multi-code correlation unit of FIG. 8 during selected operation cycles according to yet another embodiment of the disclosure.

DETAILED DESCRIPTION OF THE INVENTION

FIGS. 1 through 13, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged processing system.

Figure 1:
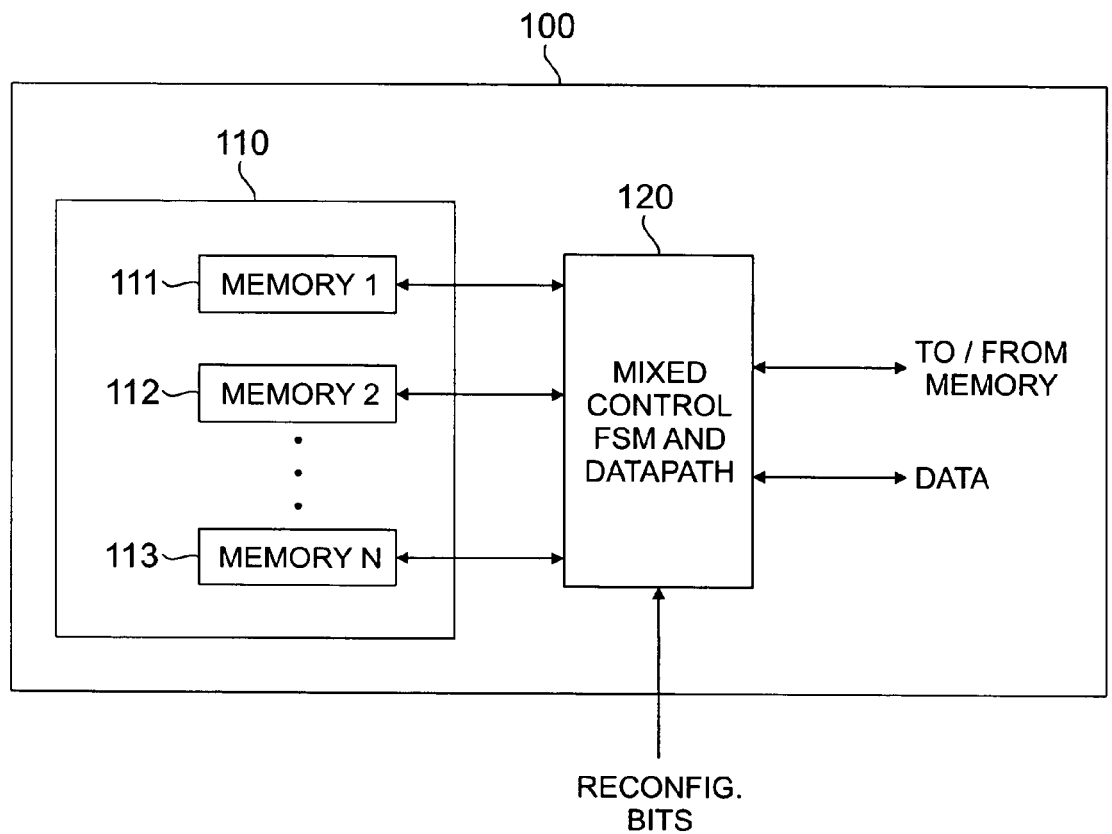
FIG. 1 is a block diagram of a conventional data processor according to an exemplary embodiment of the prior art.

FIG. 1 is a high-level block diagram of conventional data processor 100 according to an exemplary embodiment of the prior art. FIG. 1 depicts a general implementation of an application in hardware and software. Data processor 100 comprises memory 110 and control circuitry 120. Control circuitry 120 further comprises mixed control finite state machine (FSM) circuitry and datapath circuitry. Memory 110 further comprises N memory blocks, including exemplary memory blocks 111-113, which are arbitrarily labeled Memory 1, Memory 2, and Memory N.

Any data processor application may be regarded as a set of datapaths controlled and scheduled by a finite state machine (FSM), as FIG. 1 shows. A finite state machine receives input events and, in response, transitions between states and/or generates outputs. The FSM decides to which states to transition based on the current state and the received input events.

FIG. 2 illustrates finite state machine (FSM) table 200 for an exemplary data processor. FSM table 200 depicts the next state transitions performed by a FSM based on the current state (i.e., one of states S1-S10) and the received input event (i.e., one of events E1-E7). Initially, the FSM is in state S1. The column for state S1 indicates the state transitions for state S1 in response to events E1-E4.

In response to event E1 received during state S1, the FSM transitions from state S1 to state S9. In response to event E2 received during state S1, the FSM transitions from state S1 to state S2. In response to event E3 received during state S, the FSM transitions from state S1 to state S2. In response to event E4 received during state S1, the FSM transitions from state S1 to state S10.

As FIG. 2 makes clear, there are many holes in the FSM table 200 for which no values are given. For example, for state S1, no values are given for events E5-E7. In prior art data processors, those holes, although they do not contribute to the flow of the finite state machine, must be provided for, otherwise the finite state machine will not work correctly. In the prior art data processors, the finite state machines cannot be further optimized to eliminate these holes.

Figure 3:
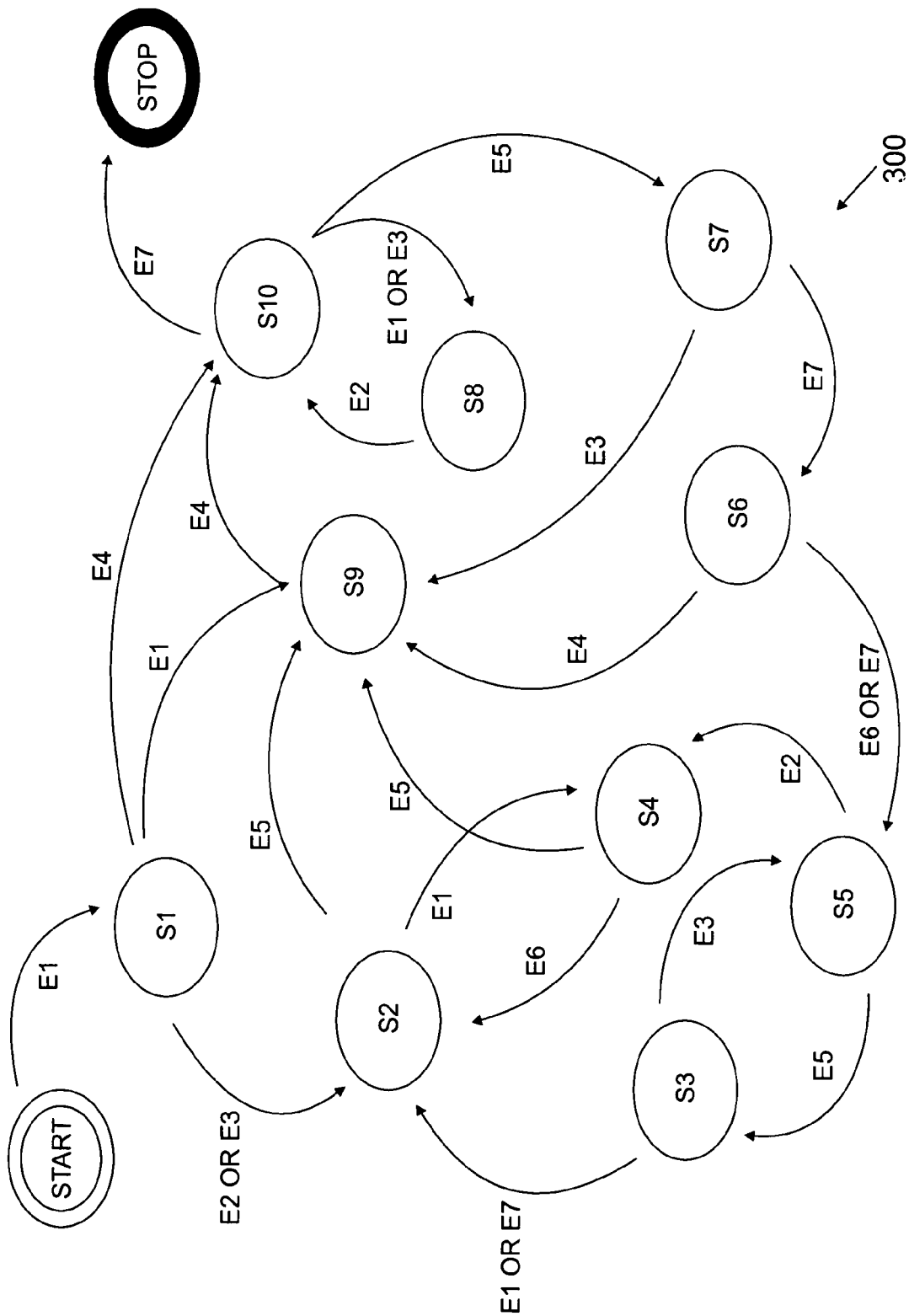
FIG. 3 is a bubble diagram corresponding to the finite state machine table of FIG. 2.

FIG. 3 illustrates bubble diagram 300, which corresponds to the finite state machine table in FIG. 2. Each of states S1-S10 is represented by a bubble and events E1-E7 cause transitions between states. These transitions are represented by the arrowed lines connecting the state bubbles. The arrowhead determines the direction of the transition.

Figure 4:
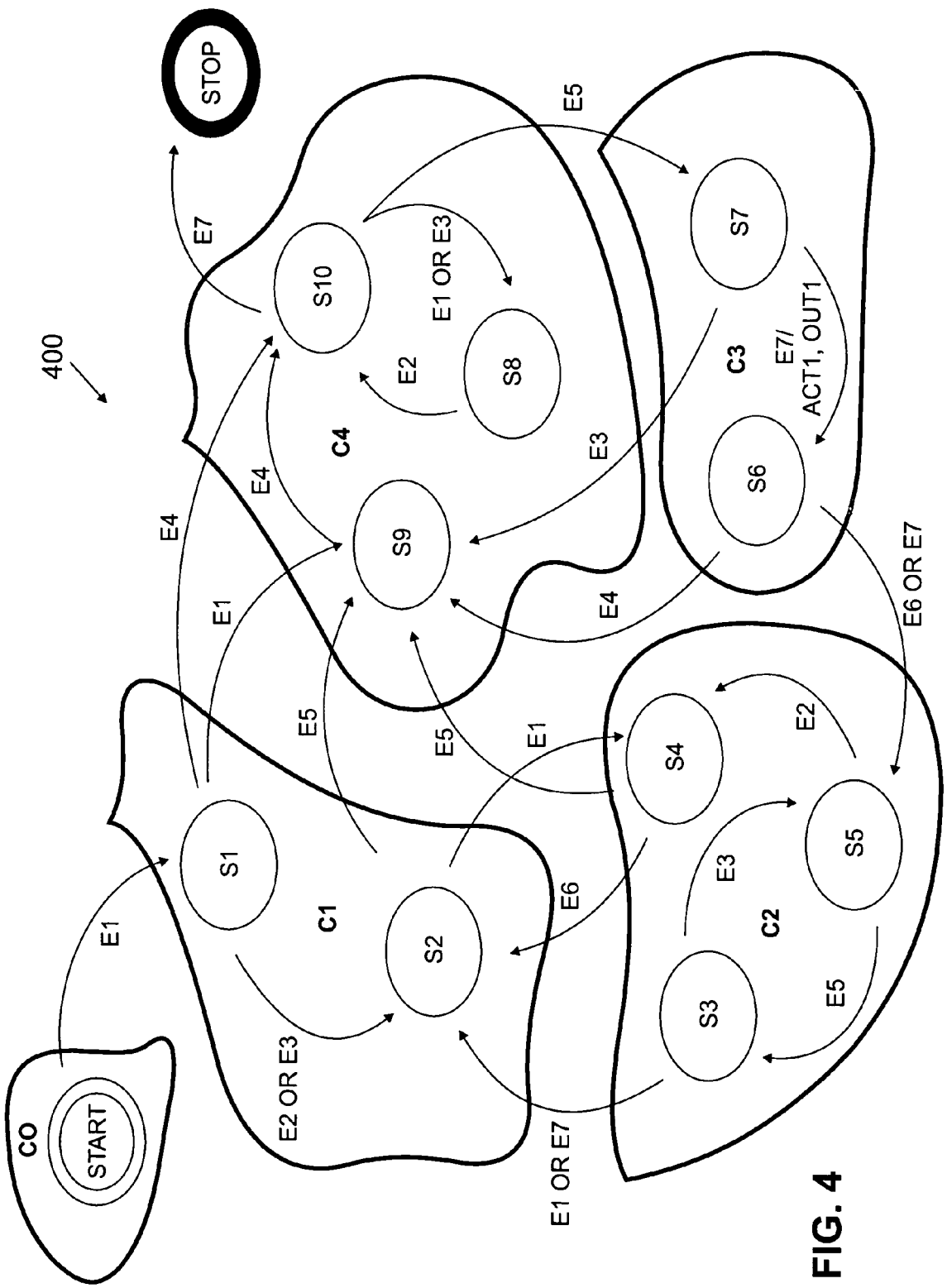
FIG. 4 is a bubble diagram showing context-based groupings of states in the finite state machine table of FIG. 2 according to one embodiment of the disclosure.

It is noted that in bubble diagram 300, it is possible to group states according to contexts of execution units. For the purposes of this disclosure, a context is a group of operations and/or instructions that are related to the same function. FIG. 4 illustrates bubble diagram 400, in which states of the finite state machine table in FIG. 2 that are related to the same context are grouped together according to the principles of the present disclosure. The groupings of states form contexts C0, C1, C2, C3 and C4.

Each of the groupings of states in FIG. 4 may be used to create a context-based operation reconfigurable instruction set processor (CRISP) according to the principles of the present disclosure. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 5:
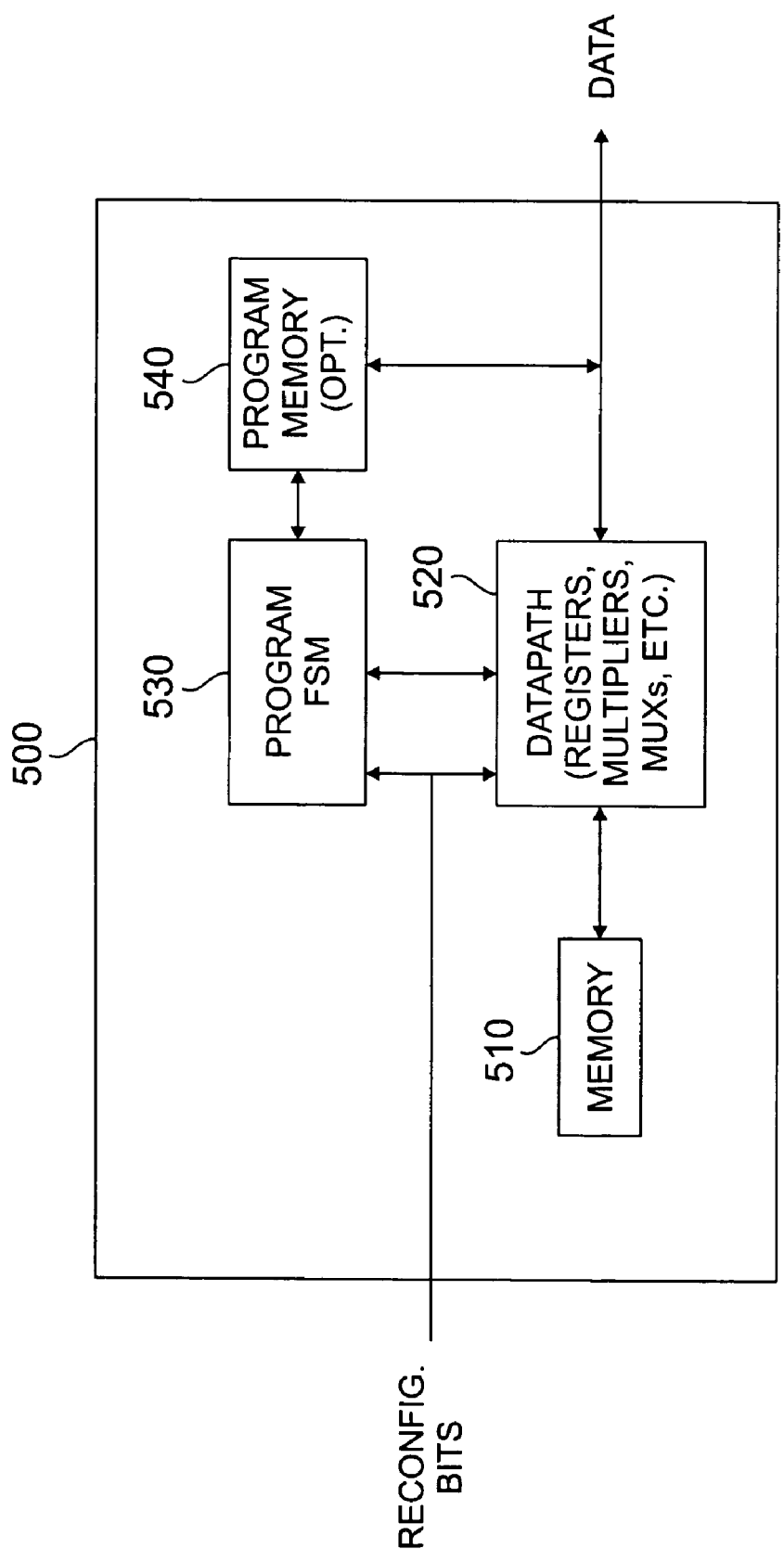
FIG. 5 is a high-level block diagram of a context-based operation reconfigurable instruction set processor according to one embodiment of the disclosure.

FIG. 5 is a high-level block diagram of context-based operation reconfigurable instruction set processor (CRISP) 500, according to an exemplary embodiment of the present disclosure. CRISP 500 comprises memory 510, programmable data path circuitry 520, programmable finite state machine 530, and optional program memory 540. CRISP 500 is designed to implement only a subset of context-related instructions from FIG. 4 in an optimum manner. Each of the contexts C0-C4 in FIG. 4 may be implemented by a separate CRISP similar to CRISP 500. CRISP 500 defines the generic hardware block that usually consists of higher level hardware processor blocks. The principle advantage to CRISP 500 is that CRISP 500 breaks down the required application into two main domains, a control domain and a data path domain, and optimizes each domain separately. By implementing a data processor application, such as a mobile station handset (e.g., cell phone, wireless laptop), using CRISP 500, the flexibility vs. power problems that adversely affect conventional data processor applications may be at least partially overcome.

The control domain is implemented by programmable finite state machine 530, which may comprise a DSP, an MCU or another suitable device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of the building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 4 is implemented by a separate CRISP 500 that works independently of other CRISPs, an efficient power management scheme is provided that is able to shut down a CRISP when the CRISP is not required to execute. This assures that only the CRISPs that are needed at a given time are active, while other idle CRISPs do not consume any significant power.

A CRISP according to the principles of the present disclosure may be targeted to many applications, including, but not limited to, baseband applications in wireless devices and multimedia applications. In many applications, these contexts may be loosely-coupled independent contexts that may run concurrently with either minimum or no dependencies.

Figure 6:
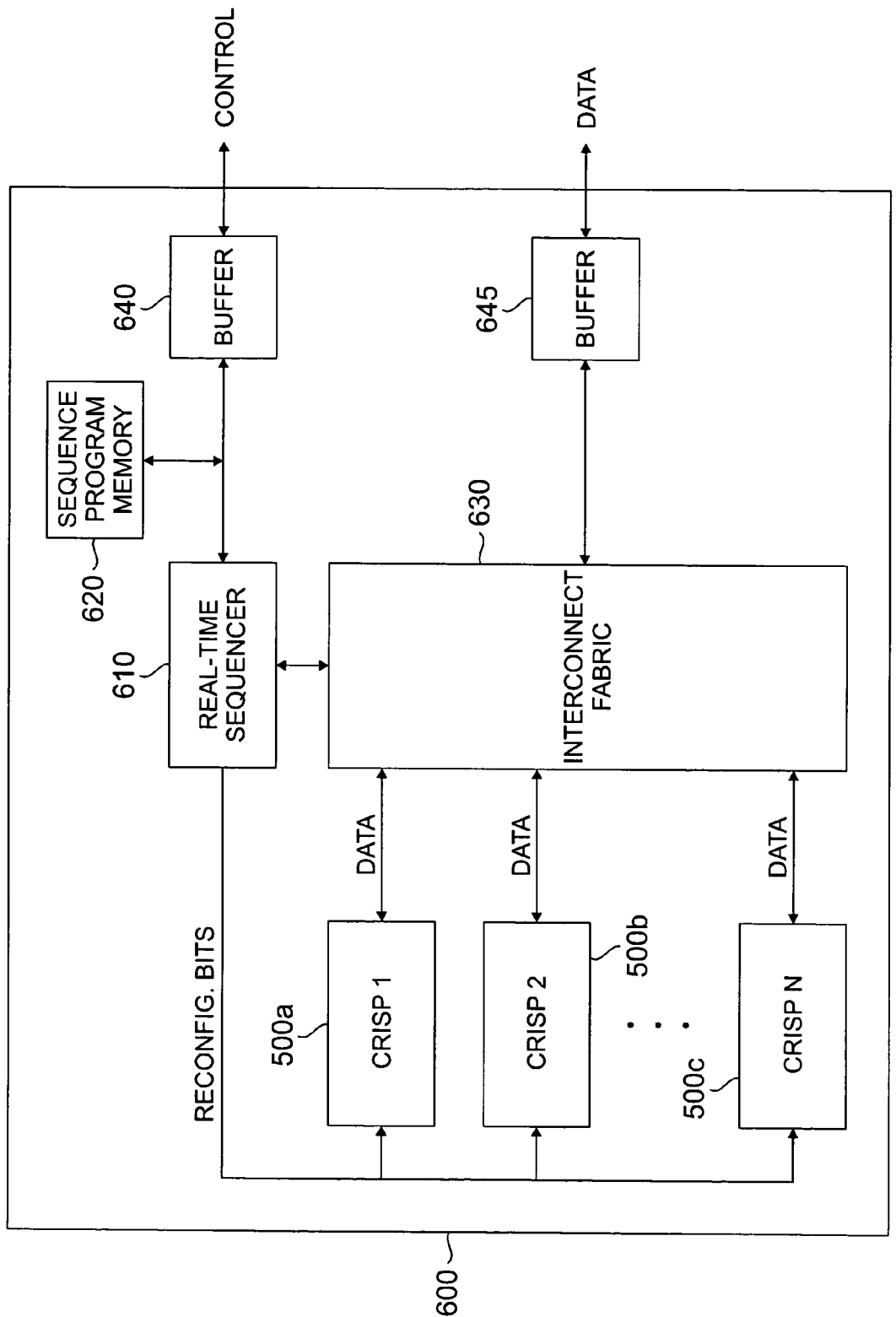
FIG. 6 is a high-level block diagram of a reconfigurable processing system comprising a plurality of context-based operation reconfigurable instruction set processors according to one embodiment of the disclosure.

FIG. 6 is a high-level block diagram of reconfigurable processing system 600 according to an exemplary embodiment of the present disclosure. Reconfigurable processing system 600 comprises N context-based operation reconfigurable instruction set processors (CRISPs), including exemplary CRISPs 500a, 500b, and 500c, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500a, 500b, and 500c from the CONTROL line via real-time sequencer 610 and buffer 640. A control program may also be loaded into sequence program memory 620 from the CONTROL line via buffer 640. Real-time sequencer 610 sequences the contexts to be executed by each one of CRISPs 500a-c by retrieving program instructions from program memory 620 and sending reconfiguration bits to CRISPs 500a-c. In an exemplary embodiment, real-time sequencer 610 may comprise a stack processor, which is suitable to operate as a real-time scheduler due to its low latency and simplicity.

Reconfigurable interconnect fabric 630 provides connectivity between each one of CRISPs 500a-c and an external DATA bus via bi-directional buffer 645. In an exemplary embodiment of the present disclosure, each one of CRISPs 500a-c may act as a master of reconfigurable interconnect fabric 630 and may initiate address access. The bus arbiter for reconfigurable interconnect fabric 630 may be internal to real-time sequencer 610.

In an exemplary embodiment, reconfigurable processing system 600 may be, for example, a cell phone or a similar wireless device, or a data processor for use in a laptop computer. In a wireless device embodiment implemented according to software-defined radio (SDR) principles, each one of CRISPs 500a-c is responsible for executing a subset of context-related instructions that are associated with a particular reconfigurable function. For example, CRISP 500a may be configured to execute context-related instructions that process HSDPA baseband signals, CDMA baseband signals or OFDMA baseband signals. CRISP 500b may be configured to execute context-related instructions that act as a memory controller. CRISP 500c may be configured to execute context-related instructions that perform MPEG-4 processing for multimedia applications.

A CRISP according to the principles of the present disclosure provides a new way of implementing reconfigurable hardware acceleration techniques and also provides reconfigurability and programmability with minimal sacrifice of power efficiency. Since the CRISPs are largely independent and may be run simultaneously, the performance advantage of parallelism is provided without incurring the full power penalty associated with running parallel operations. The loose coupling and independence of CRISPs allows them to be configured for different systems and functions that may be shut down separately.

Figure 7:
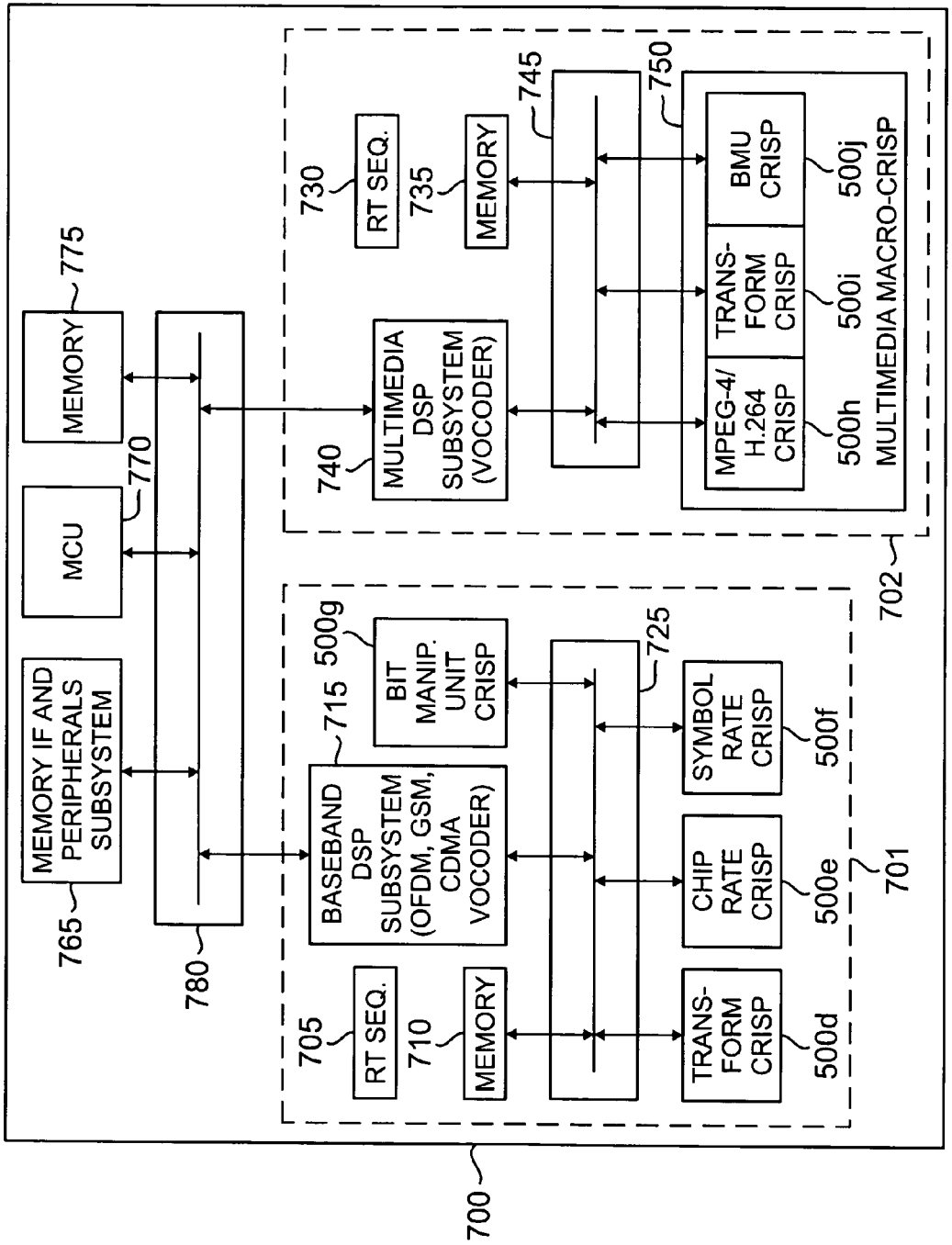
FIG. 7 is a high-level block diagram of a multi-standard software-defined radio (SDR) system comprising a plurality of context-based operation reconfigurable instruction set processors according to one embodiment of the disclosure.

FIG. 7 is a high-level block diagram of multi-standard software-defined radio (SDR) system 700, which comprises a plurality of context-based operation reconfigurable instruction set processors (CRISPSs) according to one embodiment of the present disclosure. SDR system 700 may comprise a wireless terminal (or mobile station) that accesses a wireless network, such as, for example, a GSM, CDMA or HSDPA cellular telephone, a PDA with WCDMA, HSDPA or IEEE-802.11x capabilities, or the like.

Multi-standard SDR system 700 comprises baseband subsystem 701, applications subsystem 702, memory interface (IF) and peripherals subsystem 765, main control unit (MCU) 770, memory 775, and interconnect 780. MCU 770 may comprise, for example, a conventional microcontroller or a microprocessor (e.g., x86, ARM, RISC, DSP, etc.). Memory IF and peripherals subsystem 765 may connect SDR system 700 to an external memory (not shown) and to external peripherals (not shown). Memory 775 stores data from other components in SDR system 700 and from external devices (not shown). For example, memory 775 may store a stream of incoming data samples received from an external antenna system and an RF down-converter associated with SDR system 700. Interconnect 780 provides data transfer between subsystems 701 and 702, memory IF and peripherals subsystem 765, MCU 770, and memory 775.

Baseband subsystem 701 comprises real-time (RT) sequencer 705, memory 710, baseband DSP subsystem 715, interconnect 725, and a plurality of special purpose context-based operation instruction set processors (CRISPs), including transform CRISP 500d, chip rate CRISP 500e, symbol rate CRISP 500f, and bit manipulation unit (BMU) CRISP 500g. By way of example, transform CRISP 500d may implement a Fast Fourier Transform (FFT) function, chip rate CRISP 500e may implement a correlation function for a CDMA or HSDPA signal, and symbol rate CRISP 500f may implement a Viterbi decoder function.

In such an exemplary embodiment, transform CRISP 500d may receive samples of an intermediate frequency (IF) signal stored in memory 775 and perform an FFT function that generates a sequence of chip samples at a baseband rate. Next, chip rate CRISP 500e receives the chip samples from transform CRISP 500d and performs a correlation function that generates a sequence of data symbols. Next, symbol rate CRISP 500f receives the symbol data from chip rate CRISP 500e and performs Viterbi decoding to recover the baseband user data. The baseband user data may then be used by applications subsystem 702.

In an exemplary embodiment of the present disclosure, symbol rate CRISP 500f may comprise two or more CRISPs that operate in parallel. Also, by way of example, BMU CRISP 500g may implement such functions as variable length coding, cyclic redundancy check (CRC), convolutional encoding, and the like. Interconnect 725 provides data transfer between RT sequencer 705, memory 710, baseband DSP subsystem 715 and CRISPs 500d-500g.

Applications subsystem 702 comprises real-time (RT) sequencer 730, memory 735, multimedia DSP subsystem 740, interconnect 745, and multimedia macro-CRISP 750. Multimedia macro-CRISP 750 comprises a plurality of special purpose CRISPs, including MPEG-4/H.264 CRISP 550h, transform CRISP 550i, and BMU CRISP 500j. In an exemplary embodiment of the present disclosure, MPEG-4/H.264 CRISP 550h performs motion estimation functions and transform CRISP 500h performs a discrete cosine transform (DCT) function. Interconnect 745 provides data transfer between RT sequencer 730, memory 735, multimedia DSP subsystem 740, and multimedia macro-CRISP 750.

In the exemplary embodiment shown in FIG. 7, the use of CRISP devices enables applications subsystem 702 of multi-standard SDR system 700 to be reconfigured to support multiple video standards with multiple profiles and sizes. Additionally, the use of CRISP devices enables baseband subsystem 701 of multi-standard SDR system 700 to be reconfigured to support multiple air interface standards. Thus, SDR system 700 is able to operate in different types of wireless networks (e.g., HSDPA, CDMA, GSM, 802.11x, etc.) and can play different types of video and audio formats. However, the use of CRISPs according to the principles of the present disclosure enables SDR system 700 to perform these functions with much lower power consumption than conventional wireless devices having comparable capabilities.

More particularly, the present disclosure provides a reconfigurable multi-code correlation unit that may be implemented in a context-based operation reconfigurable instruction set processor. Advantageously, a multi-code correlation unit according to the principles of the present disclosure is highly reconfigurable and may be used for different functional blocks operating under different standards, including CDMA de-spreading, IEEE-802.11b CCK demodulation, WCDMA de-spreading, cell search, HSDPA de-spreading, and the like.

Figure 8:
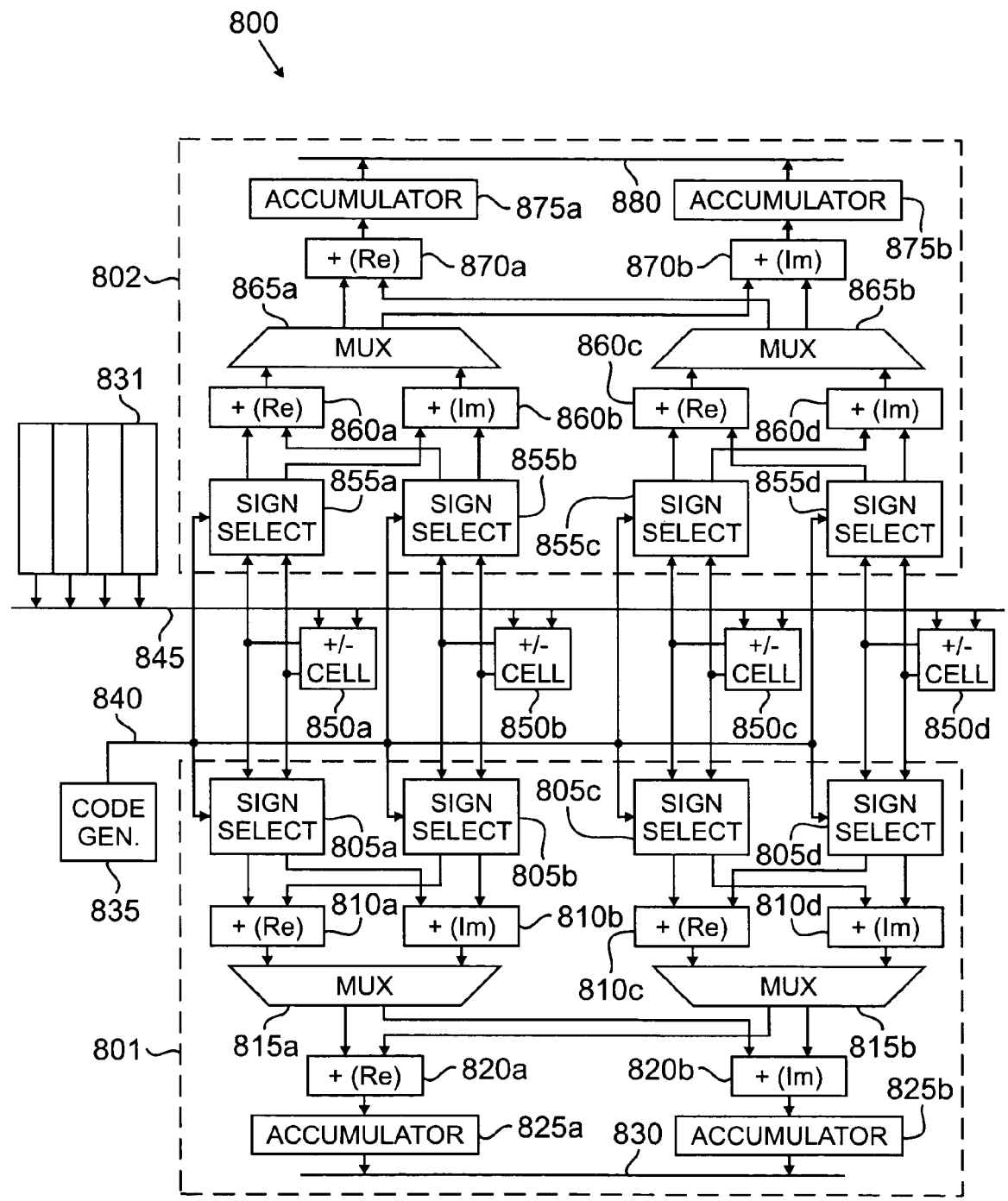
FIG. 8 is a block diagram of a multi-code correlation unit according to one embodiment of the disclosure.

FIG. 8 is a block diagram of reconfigurable multi-code correlation unit 800 according to one embodiment of the present disclosure. Multi-code correlation unit 800 may be implemented as part of chip rate CRISP 500e, for example. Multi-code correlation unit 800 comprises three main parts: data memory 831, code generator 835, and a processing unit. In the exemplary embodiment, the processing unit is implemented as two substantially identical processing sub-blocks, namely lower processing unit 801 and upper processing unit 802. Multi-code correlation unit 800 further comprises code bus 840, data bus 845, and four add-subtract (±) cells 850a-850d.

Lower processing unit 801 comprises four sign select units 805a-805d, four first stage adders 810a-810d, multiplexers (MUXes) 815a and 815b, two second stage adders 820a and 820b, accumulators 825a and 825b, and output bus 830. Upper processing unit 802 comprises four sign select units 855a-855d, four first stage adders 860a-860d, multiplexers (MUXes) 865a and 865b, two second stage adders 870a and 870b, accumulators 875a and 875b, and output bus 880.

Lower processing unit 801 and upper processing unit 802 operate independently. According to an exemplary embodiment of the present disclosure, code bus 840, data bus 845, and output buses 830 and 880 are unidirectional buses. Furthermore, in an advantageous embodiment of the present disclosure, output bus 830 and output bus 880 may be the same bus. For this reason, output bus 830 and output bus 880 will hereafter be referred to only as "output bus 830." Data bus 845 sends the chip sample data from data memory 831 to processing units 801 and 802 via cells 850a-850d. Output bus 830 writes output data from accumulators 825a and 825b and accumulators 875a and 875b to data memory 831. Code bus 840 conveys the code data generated in code generator 835 to processing units 801 and 802.

It should be noted that processing units 801 and 802, memory 831, code generator 835, and buses 830, 840, 845 and 880 may be configured for different standards and functions, including CDMA de-spreading, IEEE-802.11b CCK demodulation, WCDMA de-spreading, cell search, HSDPA de-spreading, and the like. Furthermore, each of the functional components and each of the buses may be shut down independently. The number of cells 850, the width of data memory 831, and the number of sign select units 805 and 855 illustrated and described in FIG. 8 are by way of example only. As will be seen below, the number of processing units 801 and 802 and the sizes of cells 850, data memory 831, and sign select units 805 and 855 may be varied (e.g., increased or decreased) without departing from the scope of the disclosure.

Figure 9:
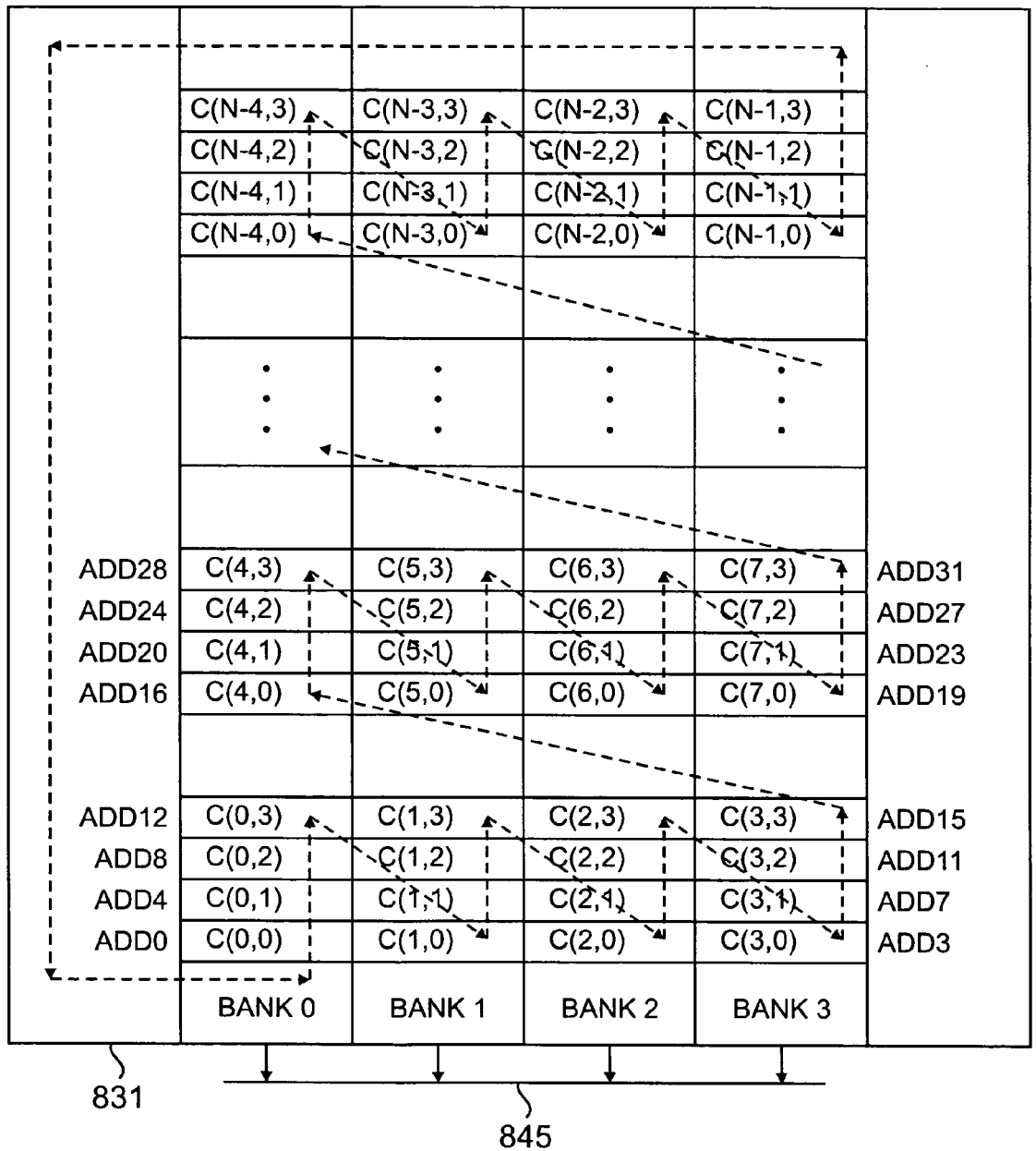
FIG. 9 is a block diagram of the memory in the multi-code correlation unit of FIG. 8 according to one embodiment of the disclosure.

FIG. 9 is a block diagram of data memory 831 in multi-code correlation unit 800 according to one embodiment of the present disclosure. Chip samples are captured from the down-converted RF signal in the receiver front-end (not shown) and are stored into four memory banks, namely Bank 0, Bank 1, Bank 2 and Bank 3, in memory 831. The order and manner in which the chip samples are stored in memory 831 is indicated by the dotted line arrows. The order and manner vary according to the amount of over-sampling of the chip data.

In FIG. 9, it is assumed that each chip of a CDMA Walsh code is sampled four times and the four samples are written in order into memory 831. Thus, 4×N chip samples from a total of N chips, C(0) through C(N−1), are to be written into memory 831. The first chip, C(0), is sampled four times and the four samples, C(0,0), C(0,1), C(0,2), and C(0,3), are written into addresses ADD0, ADD4, ADD8 and ADD12, respectively, in Bank 0 of data memory 831. Similarly, the second chip, C(1), is sampled four times and the four samples, C(1,0), C(1,1), C(1,2), and C(1,3), are written into addresses ADD1, ADD5, ADD9 and ADD13, respectively, in Bank 1 of data memory 831. The third chip, C(2), is sampled four times and the four samples, C(2,0), C(2,1), C(2,2), and C(2,3), are written into addresses ADD2, ADD6, ADD10 and ADD14, respectively, in Bank 2 of data memory 831. Finally, the fourth chip, C(3), is sampled four times and the four samples, C(3,0), C(3,1), C(3,2), and C(3,3), are written into addresses ADD3, ADD7, ADD11 and ADD15, respectively, in Bank 3 of data memory 831.

In this manner, the sixteen samples of the first four chips, C(0), C(1), C(2), and C(3), are written into the sixteen addresses from ADD0 to ADD15. This process is repeated as the sixteen samples of the next four chips, C(4), C(5), C(6), and C(7), are written into the next sixteen addresses from ADD16 to ADD31. This process continues until the sixteen samples from the last four chips, C(N−4), C(N−3), C(N−2), and C(N−1), are written into data memory 831.

In the example above, it is assumed that the over-sampling rate is four. However, the sampling rate may vary between different wireless standards. In a different configuration, the over-sampling rate may be eight, in which case eight samples from each chip are written eight deep into memory 831 in a manner similar to that shown in FIG. 9. In another configuration, the over-sampling rate may be two, in which case two samples from each chip are written two deep into memory 831 in a manner similar to that shown in FIG. 9. In still another configuration, the sampling rate may be one per chip, in which case one sample from each chip is written into memory 831 in a manner similar to that shown in FIG. 9.

The width of each chip sample may vary according to the wireless standard (e.g., QPSK, 16 QAM) used and each of the chip samples may comprise both real and imaginary data bits. For example, in a first embodiment of the present disclosure, each chip sample may be eight bits, including four real bits and four imaginary bits. In a second embodiment of the present disclosure, each chip sample may be four bits, including two real bits and two imaginary bits.

When the chip samples are to be processed in processing units 801 and 802, four chip samples at a time are read from memory 831 onto data bus 845. For example, during a first read cycle, chip samples C(0,0), C(1,0), C(2,0), C(3,0), are read in parallel from addresses ADD0 through ADD3 in Bank 0, Bank 1, Bank 2 and Bank 3, respectively. During a second read cycle, chip samples C(0,1), C(1,1), C(2,1), C(3,1), are read in parallel from addresses ADD4 through ADD7 in Bank 0, Bank 1, Bank 2 and Bank 3, respectively. Thus, four chip samples at a time are output onto bus 845 until all chip samples are read.

As each chip sample is read from memory 831, it is loaded into one of add-subtract cells 850a-850d. For example, during the first read cycle, chip sample C(0,0) is input to add-subtract cell 850a, chip sample C(1,0) is input to add-subtract cell 850b, chip sample C(2,0) is input to add-subtract cell 850c, and chip sample C(3,0) is input to add-subtract cell 850d. During the second read cycle, chip sample C(0,1) is input to add-subtract cell 850a, chip sample C(1,1) is input to add-subtract cell 850b, chip sample C(2,1) is input to add-subtract cell 850c, and chip sample C(3,1) is input to add-subtract cell 850d. Thus, four chip samples at a time are input into add-subtract cells 850a-850d until all chip samples are loaded.

Figure 10A:
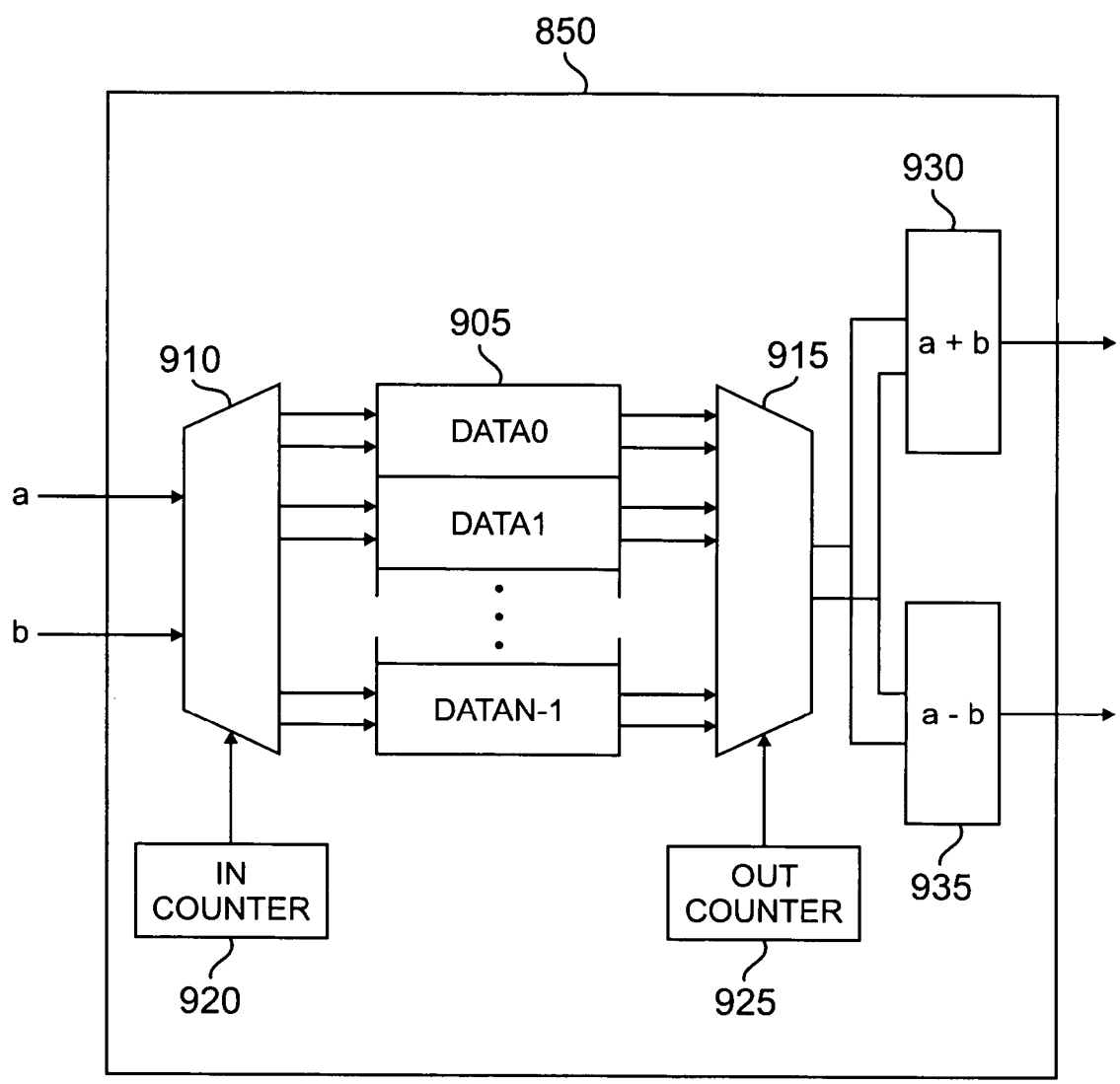
FIG. 10A illustrates an add-subtract cell in greater detail according to one embodiment of the disclosure.

FIG. 10A illustrates exemplary add-subtract cell 850 in greater detail according to an exemplary embodiment of the present disclosure. Add-subtract cell 850 comprises a data store 905, a demultiplexer 910, a multiplexer 915, an In counter 920, an Out counter 925, an addition unit 930 and a subtraction unit 935. Add-subtract cell 850 receives two inputs, a and b, and produces the sum (a+b) and the difference (a−b) of the two inputs. In FIG. 10A, the a input of each of add-subtract cells 850a-850d receives the real bits of a chip sample and the b input of each of add-subtract cells 850a-850d receives the imaginary bits of a chip sample.

For one embodiment, data store 905 comprises an N-deep FIFO (first input/first output) type of data store. The value of N may be determined based on a spreading factor. For example, for one particular embodiment in which multi-code correlation unit 800 is operating in an HSDPA mode, the value of N may be determined as follows:

$N = SF/\# \text{ cells}$, where SF is the spreading factor and the number of cells represents the number of add/substract cells 850 in multi-code correlation unit 800. Thus, for a spreading factor of 16 and four add-subtract cells 850a-d, the value of N would be 16/4, or 4.

For this embodiment, add-subtract cell 850 receives the inputs, a and b. In counter 920 cycles through a count of N (which is 4 for the example) in order to cause demultiplexer 910 to select the inputs for storage in each segment of data store 905. Thus, the inputs, a and b, are stored as Data0, Data1, Data2 and Data3 in data store 905 for the example. In this way, the same inputs are stored in each segment of data store 905.

Out counter 925 also cycles through a count of N in order to cause multiplexer 915 to select the data stored in each segment of data store 905. Thus, the inputs, a and b, are selected and provided to addition unit 930 and subtraction unit 935 for a total of N times. Then, addition unit 930 produces the sum (a+b) of the two inputs N times and subtraction unit 935 produces the difference (a−b) of the two inputs N times.

In this way, add-subtract cell 850 may provide the sum (a+b) outputs and the difference (a−b) outputs for an HSPDA or other multi-code application N times without having to obtain the inputs, a and b, with N different read operations from data memory 831 and N different write operations to add-subtract cell 850. Instead, a single read operation and a single write operation are sufficient regardless of the value of N. Thus, the power consumed by data bus 845 is reduced and addressing to data memory 831 is simplified.

The sum (a+b) outputs and the difference (a−b) outputs from each one of add-subtract cells 850a-850d are then each applied to the inputs of a first sign select unit 805 in lower processing unit 801 and a second sign select unit 855 in upper processing unit 802. For example, the sum (a+b) output and the difference (a−b) output from add-subtract cell 850a are both applied to the inputs of sign select unit 805a in lower processing unit 801 and sign select unit 855a in upper processing unit 802. Each sign select unit 805 and 855 also receives from code bus 840 two code bits generated by code generator 835. The sequence of code bits may vary according to the wireless standard for which multi-code correlation unit 800 is configured.

In an exemplary embodiment of the present disclosure, code generator 835 may comprise two components: 1) a scramble code generator and 2) two local circular memories. The scramble code generator is used for some systems, like CDMA. The local circular memories hold spreading codes in CDMA systems. These components may also be used to store some pre-defined patterns, as in a WCDMA cell search. The scramble code generator may be disabled when it is not used. For example, according to an exemplary embodiment of the present disclosure, the sixteen code bits from code generator 835 may be applied to the eight sign select units 805a-d and 855a-d in the following manner:

$U_{r0} \ U_{i0} \ L_{r0} \ L_{i0} \ U_{r1} \ U_{i1} \ L_{r1} \ L_{i1} \ U_{r2} \ U_{i2} \ L_{r2} \ L_{i2} \ U_{r3} \ U_{i3} \ L_{r3} \ L_{i3}$, where $U_{rj}$ is the jth real code bit for upper processing unit 802, $U_{ij}$ is the jth imaginary code bit for upper processing unit 802, $L_{rj}$ is the jth real code bit for lower processing unit 801, and $L_{ij}$ is the jth imaginary code bit for lower processing unit 801. Thus, for example, the first two code bits, $U_{r0}$ and $U_{i0}$, are applied to sign select unit 855a and the next two code bits, $L_{r0}$ and $L_{i0}$, are applied to sign select unit 805a.

Figures 10B, 10C:
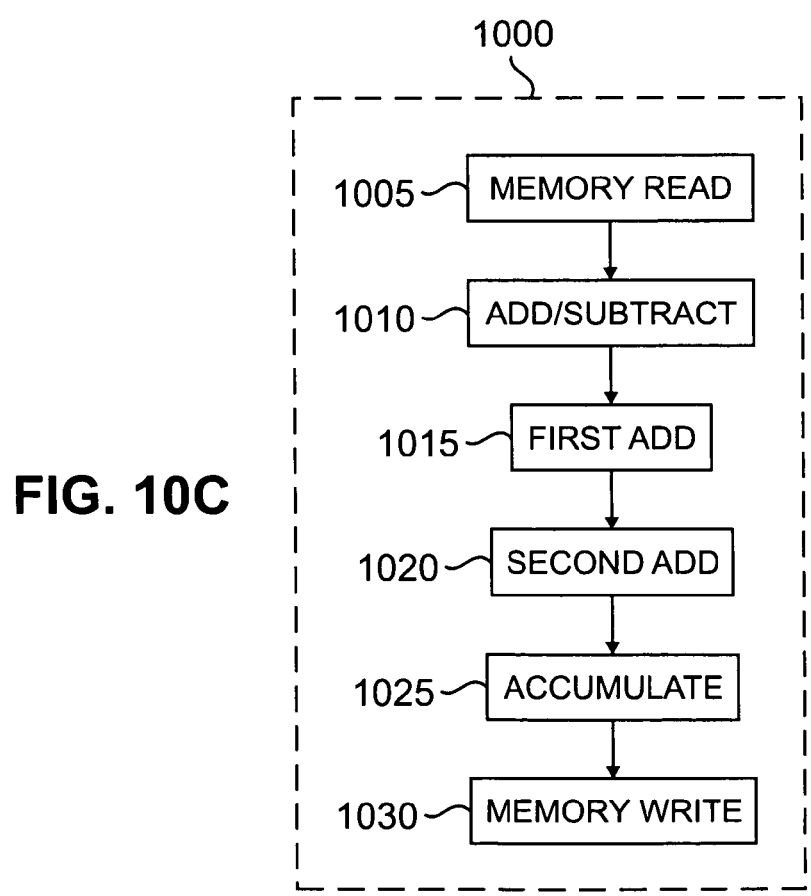
FIG. 10B illustrates a sign select unit in greater detail according to one embodiment of the disclosure.
FIG. 10C is a flow diagram illustrating the operation of the multi-code correlation unit according to one embodiment of the disclosure.

FIG. 10B depicts a truth table illustrating the operation of sign select units 805a-d and 855a-d in greater detail according to an exemplary embodiment of the present disclosure. Each one of sign select units 805a-d and 855a-d receives a sum (a+b) input and a difference (a−b) input from one of add-subtract cells 850a-d. Each one of sign select units 805a-d and 855a-d also receives a real code generator bit, CG(Re), and an imaginary code generator bit, CG(Im). In response, each one of sign select units 805a-d and 855a-d produces a real output, Output(Re), and an imaginary output, Output(Im), according to the value of the real and imaginary code generator bits.

For example, if sign select unit 855a receives the input $CG(Re)=U_{r0}=1$ and the input $CG(Im)=U_{i0}=0$, then the real and imaginary outputs of sign select unit 855a are Output(Re) =(−a+b) and Output(Im)=(−a−b). In essence, each of cells 850a-d produces the sum and difference values (a+b) and (a−b), and then each of sign select units 805a-d and 855a-d multiplies (a+b) and (a−b) by either +1 or −1, depending on the values of the corresponding real and imaginary code generator bits, CG(Re) and CG(Im).

The real and imaginary outputs, Output(Re) and Output (Im), from each sign select unit 805 and 855 are then applied to the first stage adders 810a-d and 860a-d. For example, the real output, Output(Re), from sign select unit 805a is applied to a first input of real (Re) adder 810a and the imaginary output, Output(Im), from sign select unit 805a is applied to a first input of imaginary (Im) adder 810b. Similarly, the real output, Output(Re), from sign select unit 805b is applied to a second input of real (Re) adder 810a and the imaginary output, Output(Im), from sign select unit 805b is applied to a second input of imaginary (Im) adder 810b.

The real and imaginary sums produced by first stage adders 810a-d and 860a-d are then applied to multiplexers 815a-b and 865a-b. For example, MUX 815a receives the real sum produced by adder 810a and receives the imaginary sum produced by adder 810b. Multiplexers 815a and 815b and 865a and 865b then apply either the real sums or the imaginary sums to the second stage adders 820a-b and 870a-b. For example, real (Re) adder 820a receives the real sum produced by adder 810a as a first input from MUX 815a and receives the real sum produced by adder 810c as a second input from MUX 815b. Similarly, imaginary (Im) adder 820b receives the imaginary sum produced by adder 810b as a first input from MUX 815a and receives the imaginary sum produced by adder 810d as a second input from MUX 815b.

In lower processing unit 801, the sum produced by real adder 820a is added to the value in real accumulator 825a and the sum produced by imaginary adder 820b is added to the value in imaginary accumulator 825b. In upper processing unit 802, the sum produced by real adder 870a is added to the value in real accumulator 875a and the sum produced by imaginary adder 870b is added to the value in imaginary accumulator 875b.

FIG. 10C depicts flow diagram 1000, which summarizes the operation of processing units 801 and 802 in multi-code correlation unit 800 according to the principles of the present disclosure. For the sake of simplicity, it shall be assumed that lower processing unit 801 is being discussed in FIG. 10C. Initially, four chip samples are read from memory 831 into processing unit 801 (process step 1005). Next, add-subtract cells 850a-850d produce sum (a+b) values and difference (a−b) values (process step 1010). The signs of the sum and difference values are modified according to the code bits from code generator 835. Next, the first stage addition occurs (process step 1015). The first stage addition reduces the four real inputs from sign select units 810a-810d down to two real sum values and reduces the four imaginary inputs from sign select units 810a-810d down to two imaginary sum values.

Next, the second stage addition occurs (process step 1020). The second stage addition reduces the two real sums from the first stage adders down to one real sum value and reduces the two imaginary sums from first stage adders down to one imaginary sum value. The real and imaginary sums produced by the second stage adders are then accumulated separately (process step 1025). Finally, when all of the chips in a symbol have been added in accumulators 825a and 825b, the values in accumulators 825a and 825b are written into memory 831 via bus 830.

It is noted that there will be a varying spreading factor according to the wireless standard used and the type of signal processed. For example, if lower processing unit 801 is processing a signal from a dedicated physical channel (DPCH) in a WCMDA embodiment, there may be as few as eight (8) chips to a symbol. In such a case, data is written out from accumulators 825a and 825b once every 8 chips. At the same time, upper processing unit 802 may be processing a common pilot channel (CPICH) signal in a WCMDA embodiment. The CPICH signal uses Spreading Code 0, which has 256 chips to a symbol. In such a case, data is written out from accumulators 875a and 875b once every 256 chips. This scenario is depicted in FIG. 11.

Figure 11:
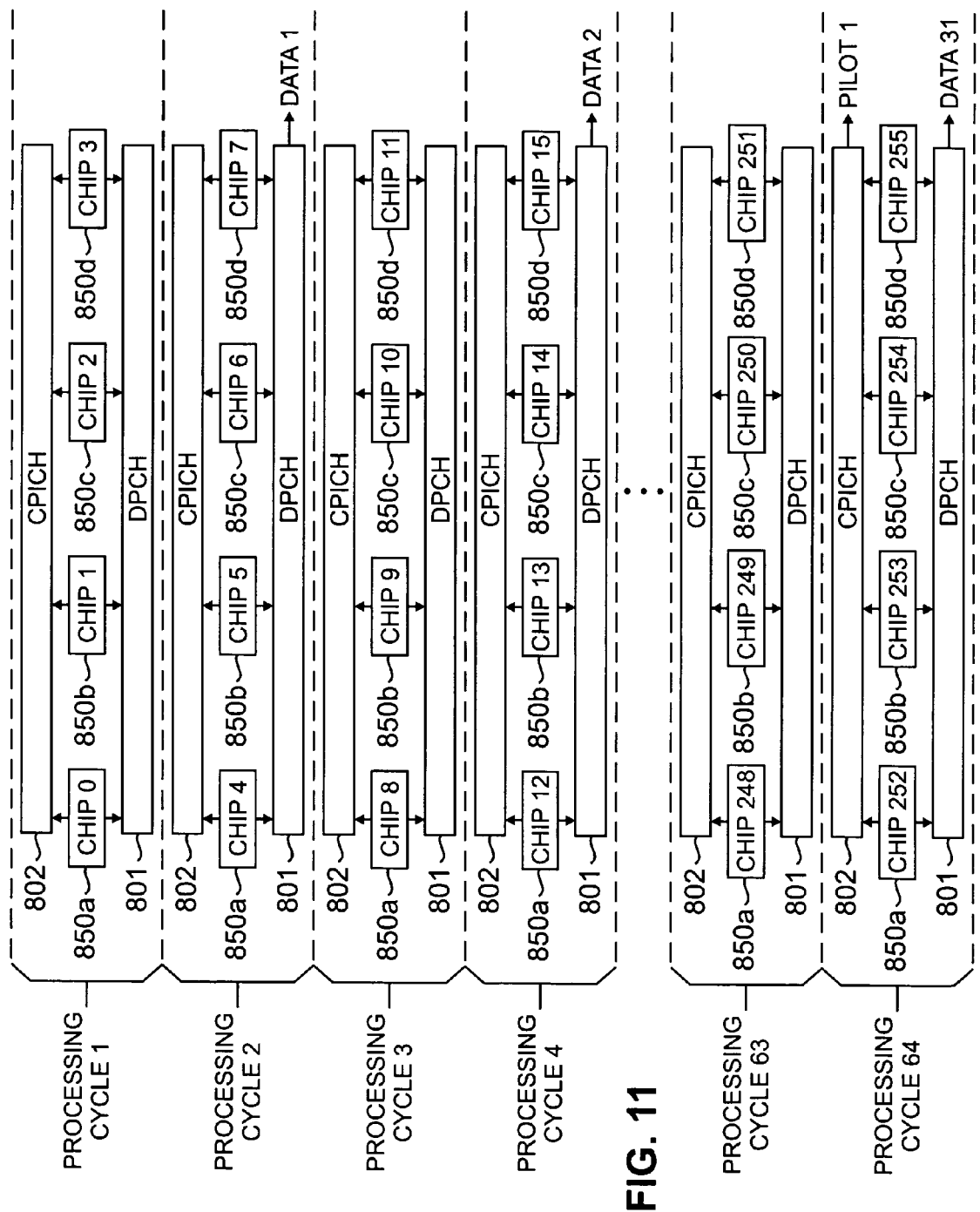
FIG. 11 illustrates the data output of the multi-code correlation unit of FIG. 8 during selected operation cycles according to one embodiment of the disclosure.

FIG. 11 illustrates the data outputs of multi-code correlation unit 800 during the despreading of a WCDMA signal according to one embodiment of the present disclosure. In FIG. 11, lower processing unit 801 is processing a dedicated physical channel (DPCH) signal that uses 8-chip symbols and upper processing unit 802 is processing a common pilot channel (CPICH) signal using a 256-chip symbol. During Processing Cycle 1, lower processing unit 801 and upper processing unit 802 each process the first four chips, Chip 0 through Chip 3.

If one sample is taken per chip, Processing Cycle 1 requires only one memory read cycle from memory 831. If two samples are taken per chip (over-sampling rate=2), Processing Cycle 1 requires two memory read cycles from memory 831. If four samples are taken per chip (over-sampling rate=4), Processing Cycle 1 requires four memory read cycles from memory 831, and so forth. At the end of Processing Cycle 1, processing unit 801 has stored the results in accumulators 825a and 825b but does not yet have an output, since a full 8-chip symbol has not yet been processed. Similarly, at the end of Processing Cycle 1, processing unit 802 has stored the results in accumulators 875a and 875b but does not yet have an output, since a full 256-chip symbol has not yet been processed.

During Processing Cycle 2, lower processing unit 801 and upper processing unit 802 each process the next four chips, Chip 4 through Chip 7. At the end of Processing Cycle 2, processing unit 801 outputs the results in accumulators 825a and 825b as Data 1, since a full 8-chip symbol has been processed. At the end of Processing Cycle 2, processing unit 802 continues to store the results in accumulators 875a and 875b but does not yet have an output, since a full 256-chip symbol has not yet been processed.

This process continues for a total of 64 Processing Cycles, with processing unit 801 putting out a result once every two cycles as groups of eight chips are processed. Processing unit 802 only puts out one result, Pilot 1, in Processing Cycle 64 after all 256 chips are processed.

Figure 12:
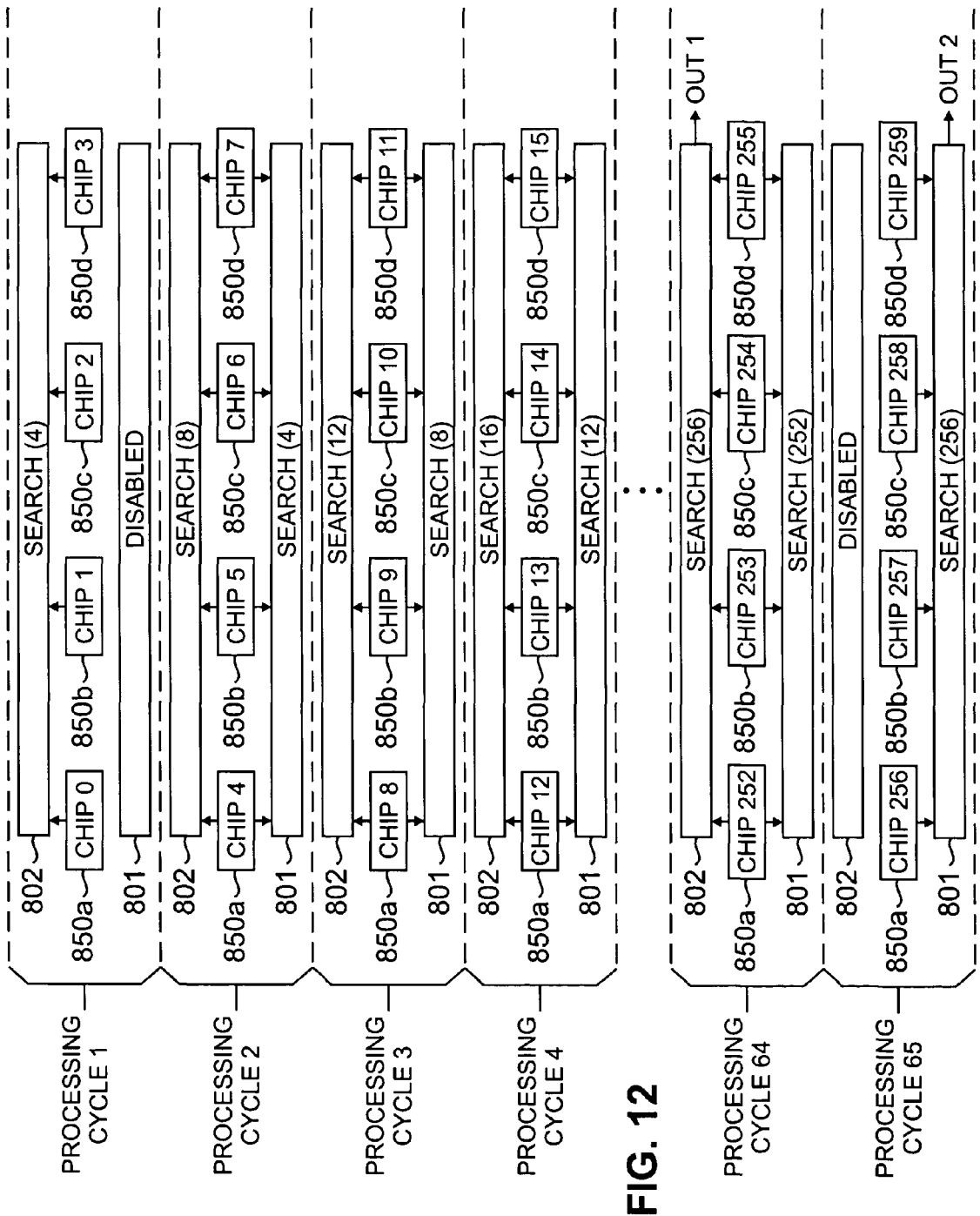
FIG. 12 illustrates the data output of the multi-code correlation unit of FIG. 8 during selected operation cycles according to another embodiment of the disclosure.

FIG. 12 illustrates the data output of the multi-code correlation unit in FIG. 8 during a WCDMA cell search operation according to one embodiment of the present disclosure. Processing unit 801 trails processing unit 802 by 4 chips. At the end of Processing Cycle 1, processing unit 802 has processed the first four chips, Chip 0 through Chip 3, while processing unit 801 was disabled (idle). At the end of Processing Cycle 2, processing unit 802 has processed a total of 8 chips and processing unit 801 has processed a total of 4 chips. At the end of Processing Cycle 3, processing unit 802 has processed a total of 12 chips and processing unit 801 has processed a total of 8 chips. At the end of Processing Cycle 4, processing unit 802 has processed a total of 16 chips and processing unit 801 has processed a total of 12 chips.

At the end of Processing Cycle 64, processing unit 802 has processed a total of 256 chips and outputs a result, Out 1. At the same time, processing unit 801 has processed a total of 252 chips. At the end of Processing Cycle 65, processing unit 801 has processed a total of 256 chips and outputs a result, Out 2. During Processing Cycle 65, processing unit 802 is disabled (idle).

Advantageously, because memory 831, code generator 835, and processing units 801 and 802 are loosely coupled, these components may be configured for different systems and/or functions. Also, memory 831, code generator 835, and processing units 801 and 802 may be shut down separately when not in use in order to save power. Moreover, the multi-code correlation unit architecture described above is easily scalable and may be easily duplicated to achieve the required performance.

FIG. 13 illustrates the data outputs of multi-code correlation unit 800 during the despreading of an HSDPA signal according to one embodiment of the present disclosure. In FIG. 13, lower processing unit 801 is processing a 16-chip symbol and upper processing unit 802 is also processing a 16-chip symbol. During Processing Cycle 1, lower processing unit 801 and upper processing unit 802 each process the first four chips, Chip 0 through Chip 3.

At the end of Processing Cycle 1, processing unit 801 has stored the results in accumulators 825a and 825b but does not yet have an output, since a full 16-chip symbol has not yet been processed. Similarly, at the end of Processing Cycle 1, processing unit 802 has stored the results in accumulators 875a and 875b but does not yet have an output, since a full 16-chip symbol has not yet been processed.

During Processing Cycle 2, lower processing unit 801 and upper processing unit 802 each process the next four chips, Chip 4 through Chip 7. During Processing Cycle 3, lower processing unit 801 and upper processing unit 802 each process the next four chips, Chip 8 through Chip 11. During Processing Cycle 4, lower processing unit 801 and upper processing unit 802 each process the next four chips, Chip 12 through Chip 15.

At the end of Processing Cycle 4, processing unit 801 outputs the results in accumulators 825a and 825b as Symbol1_out, since a full 16-chip symbol has been processed, and processing unit 802 outputs the results in accumulators 875a and 875b as Symbol0_out, since a full 16-chip symbol has been processed. This process continues for a total of 24 Processing Cycles, with processing unit 801 and processing unit 802 each putting out a result once every four cycles as groups of sixteen chips are processed. Thus, at the end of Processing Cycle 24, each processing unit 801 and 802 has put out six results, for a total of twelve results.

Although the present disclosure has been described with an exemplary embodiment, various changes and modifications may be suggested to one skilled in the art. It is intended that the present invention encompass such changes and modifications as fall within the scope of the appended claims.

What is claimed is:

1. A reconfigurable multi-code correlation unit for correlating a sequence of chip samples, comprising:
a memory for storing said sequence of chip samples;
a plurality of add-subtract cells, wherein each of said add-subtract cells is capable of receiving a plurality of real bits, a, from a first chip sample in said memory and a plurality of imaginary bits, b, from said first chip sample, and wherein each of said add-subtract cells is capable of storing each real bit, a, and each imaginary bit, b, N times in an N-deep first input/first output (FIFO) data store, wherein N is determined by dividing a spreading factor by the number of add-subtract cells in the plurality of add-subtract cells; and
a processing unit comprising:
a plurality of sign select units, each of said plurality of sign select units capable of receiving from one of said plurality of add-subtract cells a plurality of first inputs equal to a sum (a+b) of said plurality of real bits, a, and said plurality of imaginary bits, b, and a plurality of second inputs equal to a difference (a−b) of said plurality of real bits, a, and said plurality of imaginary bits, b, and wherein said each sign select unit generates a plurality of real outputs and a plurality of imaginary outputs, wherein each of said real outputs and said imaginary outputs is equal to one of 1) said sum (a+b) multiplied by one of +1 and −1 and 2) said difference (a−b) multiplied by one of +1 and −1.

2. The multi-code correlation unit as set forth in claim 1, further comprising a code generator for generating a sequence of code bits, wherein said each sign select unit receives a real code bit and an imaginary code bit from said sequence and wherein said real and imaginary code bits determine a value of said real output and a value of said imaginary output of said each sign select unit.

3. The multi-code correlation unit as set forth in claim 2, wherein said processing unit further comprises a first stage of adders comprising a first plurality of real adders and a first plurality of imaginary adders.

4. The multi-code correlation unit as set forth in claim 3, wherein each of said first plurality of real adders receives a first real output from one of said plurality of sign select units and a second real output from another one of said plurality of sign select units and produces a real sum output.

5. The multi-code correlation unit as set forth in claim 4, wherein each of said first plurality of imaginary adders receives a first imaginary output from one of said plurality of sign select units and a second imaginary output from another one of said plurality of sign select units and produces an imaginary sum output.

6. The multi-code correlation unit as set forth in claim 5, wherein said processing unit further comprises a second stage of adders comprising at least one real adder and at least one imaginary adder.

7. The multi-code correlation unit as set forth in claim 6, wherein each of said at least one real adder in said second stage receives a first real sum output from one of said first plurality of real adders and a second real sum output from another one of said first plurality of real adders and produces a real sum output.

8. The multi-code correlation unit as set forth in claim 7, wherein each of said at least one imaginary adder in said second stage receives a first imaginary sum output from one of said first plurality of imaginary adders and a second imaginary sum output from another one of said first plurality of imaginary adders and produces an imaginary sum output.

9. The multi-code correlation unit as set forth in claim 8, wherein said processing unit further comprises a first accumulator capable of receiving and accumulating real sum outputs from said at least one real adder in said second stage.

10. The multi-code correlation unit as set forth in claim 9, wherein said processing unit further comprises a second accumulator capable of receiving and accumulating real sum outputs from said at least one imaginary adder in said second stage.

11. The multi-code correlation unit as set forth in claim 10, wherein each of said plurality of sign select units is capable of receiving from one of said plurality of add-subtract cells the specified number of first inputs and the specified number of second inputs.

12. The multi-code correlation unit as set forth in claim 10, wherein each of said add-subtract cells comprises a demultiplexer coupled to an input of the data store and a multiplexer coupled to an output of the data store.

13. A software-defined radio system comprising a reconfigurable data processor, said reconfigurable data processor comprising a reconfigurable multi-code correlation unit for correlating a sequence of chip samples, said reconfigurable multi-code correlation unit comprising:
- a memory for storing said sequence of chip samples;
- a plurality of add-subtract cells, wherein each of said add-subtract cells is capable of receiving a plurality of real bits, a, from a first chip sample in said memory and a plurality of imaginary bits, b, from said first chip sample, and wherein each of said add-subtract cells is capable of storing each real bit, a, and each imaginary bit, b, N times in an N-deep first input/first output (FIFO) data store, wherein N is determined by dividing a spreading factor by the number of add-subtract cells in the plurality of add-subtract cells; and
- a processing unit comprising:
- a plurality of sign select units, each of said plurality of sign select units capable of receiving from one of said plurality of add-subtract cells a plurality of first inputs equal to a sum (a+b) of said plurality of real bits, a, and said plurality of imaginary bits, b, and a plurality of second inputs equal to a difference (a−b) of said plurality of real bits, a, and said plurality of imaginary bits, b, and wherein said each sign select unit generates a plurality of real outputs and a plurality of imaginary outputs, wherein each of said real outputs and said imaginary outputs is equal to one of 1) said sum (a+b) multiplied by one of +1 and −1 and 2) said difference (a−b) multiplied by one of +1 and −1.

14. The software-defined radio system as set forth in claim 13, further comprising a code generator for generating a sequence of code bits, wherein said each sign select unit receives a real code bit and an imaginary code bit from said sequence and wherein said real and imaginary code bits determine a value of said real output and a value of said imaginary output of said each sign select unit.

15. The software-defined radio system as set forth in claim 14, wherein said processing unit further comprises a first stage of adders comprising a first plurality of real adders and a first plurality of imaginary adders.

16. The software-defined radio system as set forth in claim 15, wherein each of said first plurality of real adders receives a first real output from one of said plurality of sign select units and a second real output from another one of said plurality of sign select units and produces a real sum output.

17. The software-defined radio system as set forth in claim 16, wherein each of said first plurality of imaginary adders receives a first imaginary output from one of said plurality of sign select units and a second imaginary output from another one of said plurality of sign select units and produces an imaginary sum output.

18. The software-defined radio system as set forth in claim 17, wherein said processing unit further comprises a second stage of adders comprising at least one real adder and at least one imaginary adder.

19. The software-defined radio system as set forth in claim 18, wherein each of said at least one real adder in said second stage receives a first real sum output from one of said first plurality of real adders and a second real sum output from another one of said first plurality of real adders and produces a real sum output.

20. The software-defined radio system as set forth in claim 19, wherein each of said at least one imaginary adder in said second stage receives a first imaginary sum output from one of said first plurality of imaginary adders and a second imaginary sum output from another one of said first plurality of imaginary adders and produces an imaginary sum output.

21. The software-defined radio system as set forth in claim 20, wherein said processing unit further comprises a first accumulator capable of receiving and accumulating real sum outputs from said at least one real adder in said second stage.

22. The software-defined radio system as set forth in claim 21, wherein said processing unit further comprises a second accumulator capable of receiving and accumulating real sum outputs from said at least one imaginary adder in said second stage.

23. The software-defined radio system as set forth in claim 22, wherein each of said plurality of sign select units is capable of receiving from one of said plurality of add-subtract cells the specified number of first inputs and the specified number of second inputs.

24. The software-defined radio system as set forth in claim 22, wherein each of said add-subtract cells comprises a demultiplexer coupled to an input of the data store and a multiplexer coupled to an output of the data store.

25. A reconfigurable multi-code correlation unit for correlating a sequence of chip samples, comprising:
- a memory for storing said sequence of chip samples;
- a plurality of add-subtract cells, wherein each of said add-subtract cells is capable of receiving a plurality of real bits, a, from a first chip sample in said memory and a plurality of imaginary bits, b, from said first chip sample, and wherein each of said add-subtract cells is capable of storing each real bit, a, and each imaginary bit, b, in an N-deep first input/first output (FIFO) data store, and wherein each of said add-subtract cells comprises a demultiplexer coupled to an input of the data store and a multiplexer coupled to an output of the data store; and
- a processing unit comprising:
- a plurality of sign select units, each of said plurality of sign select units capable of receiving from one of said plurality of add-subtract cells a plurality of first inputs equal to a sum (a+b) of said plurality of real bits, a, and said plurality of imaginary bits, b, and a plurality of second inputs equal to a difference (a−b) of said plurality of real bits, a, and said plurality of imaginary bits, b, and wherein said each sign select unit generates a plurality of real outputs and a plurality of imaginary outputs, wherein each of said real outputs and said imaginary outputs is equal to one of 1) said sum (a+b) multiplied by one of +1 and −1 and 2) said difference (a−b) multiplied by one of +1 and −1.

26. The multi-code correlation unit as set forth in claim 25, wherein the reconfigurable multi-code correlation unit further comprises a code generator for generating a sequence of code bits, wherein said each sign select unit receives a real code bit and an imaginary code bit from said sequence and wherein said real and imaginary code bits determine a value of said real output and a value of said imaginary output of said each sign select unit.

27. The multi-code correlation unit as set forth in claim 26, wherein said processing unit further comprises a first stage of adders comprising a first plurality of real adders and a first plurality of imaginary adders.

28. The multi-code correlation unit as set forth in claim 27, wherein each of said first plurality of real adders receives a first real output from one of said plurality of sign select units and a second real output from another one of said plurality of sign select units and produces a real sum output.

* * * * *